United States Patent [19]

Uchiyama et al.

[11] Patent Number: 4,908,712
[45] Date of Patent: Mar. 13, 1990

[54] METHOD FOR TONE REPRODUCTION IN IMAGE FORMING SYSTEM

[75] Inventors: Tadamitsu Uchiyama; Tetsuya Iida, both of Osaka, Japan

[73] Assignee: Minolta Camera Kabushiki Kaisha, Osaka, Japan

[21] Appl. No.: 320,556

[22] Filed: Mar. 8, 1989

[30] Foreign Application Priority Data

Mar. 9, 1988 [JP] Japan .................... 63-53838

[51] Int. Cl.$^4$ .......... G03F 3/08; H04N 1/21; G01D 15/16

[52] U.S. Cl. ................. 358/298; 346/140 R; 358/79; 358/80; 358/456

[58] Field of Search ......... 358/75, 79, 80, 298, 358/455, 456, 457, 458, 461; 346/140 R

[56] References Cited

U.S. PATENT DOCUMENTS

| | | | |
|---|---|---|---|
| 4,673,951 | 6/1987 | Mutoh et al. | 358/75 |
| 4,682,186 | 7/1987 | Sasaki | 358/80 |
| 4,682,216 | 6/1987 | Sasaki et al. | 346/140 R |
| 4,683,492 | 7/1987 | Sugiura | 358/80 |

FOREIGN PATENT DOCUMENTS 62-57144  11/1987  Japan .

Primary Examiner—Teresa J. Walberg
Assistant Examiner—Scott A. Rogers
Attorney, Agent, or Firm—Burns, Doane, Swecker & Mathis

[57] ABSTRACT

A method for reproduction of a multi-tone color image by combination of chromatic inks of cyan, magenta and yellow together with an achromatic ink of black. In the region of lower tone levels than a prescribed value, the image is formed by the complete under color removal, namely, by the sole use of the achromatic ink. In the region of higher tone levels than the prescribed value, the reproduction of the image is attained by performing the under color removal at a ratio of decrease relative to the rise of the tone levels, namely by causing the chromatic inks to overlap the achromatic ink.

8 Claims, 6 Drawing Sheets

METHOD FOR TONE REPRODUCTION IN IMAGE FORMING SYSTEM

BACKGROUND OF THE INVENTION

1. Field of the Invention

This invention relates to a method for tone reproduction which effects reproduction of an image by combination of chromatic inks of cyan, magenta and yellow, together with an achromatic ink of black. More particularly, this invention relates to a method for tone reproduction which, on being used for a color image forming system, such as an ink jet recording system, enables a color image to be reproduced with a tone range amply wide.

2. Description of the Prior Art

Recently, the color image forming system which, in accordance with input color image data, forms on a recording paper a color image has been disseminating in various fields. Among other versions of the color image forming system, the ink jet recording system pre-eminently excels in the ability of tone reproduction and, therefore, is finding utility mainly in the field of activities devoted to the design of apparels and interior articles and to the processing of pertinent images, namely the field which demands high level of tone reproduction.

The ink jet recording system is designed to effect a noncontacting formation of a color image by causing inks of three colors of cyan (C), magenta (M) and yellow (Y), together with an ink of black (K) optionally, to adhere to a recording paper. In the formation of the color image, a certain color is formed by a specific combination of the inks to be adhered with the technique of the subtractive mixture as shown in FIG. 1A. In general, the image with intermediate levels of tones is reproduced with modulation of a dot density in the ink jet recording system because it is difficult to vary dot diameter.

Various inventions have been proposed for formation of a color image. For example, U.S. Pat. No. 4,673,951 discloses an ink jet recording machine which forms a multi-tone color image using four color inks of C, M, Y and K. Japanese Patent Publication SHO 62(1987)-57144 also discloses an ink jet recording machine which reproduces a color image with inks of C, M, Y and K. The machines in both publications varies a dot density of a picture element for intermediate levels of tones. A picture element to be reproduced with all of three inks of C, M and Y has a black component to be represented by overlapping the three color inks each other. Such black component can be reproduced by only the black ink.

Conventionally, two methods of formation of a color image by the aforementioned four color inks are known. On of the methods uses, for reproducing a picture element of a certain color, the three color inks of C, M and Y which have the respective amounts each subtracted by an equal amount corresponding to a portion of the black component of the picture element as well as the black ink which has the amount corresponding to the portion of the black component as shown in FIG. 1B and 1C. Such a treatment of subtracting the equal amount corresponding to the black component from the three color inks of C, M and Y and adding the black ink is referred to as "under color removal (hereinafter referred to as, "UCR" for short)". While the other one of methods uses, for reproducing a picture element of a certain color, the two color inks selected from the three color inks of C, M and Y as well as the black ink. In this method, the two color inks selected from C, M and Y have the respective amounts each subtracted by an equal amount corresponding to the whole black component which coincides the amount of the excepted ink of C, M or Y, while the black ink has the amount corresponding to the whole black component as shown in FIG. 1D. Hereinafter, the act of the former in which the four color inks is used is called "a partial UCR", while that of the latter in which the three color inks is used is called "a complete UCR".

When the partial UCR is used for formation of a color image, since the four color inks are always used, the respective inks areas often adhered to positions deviating from the proper positions, hence inducing misregistration. The misregistration conspicuously occurs particularly when the achromatic color is reproduced in the region of low levels of tones from the viewpoint of visual sense.

While, when the complete UCR is used, the possibility of the misregistration is completely eliminated because of the reduced number of the inks, however, the sufficient density of the complete black is not obtained. A black ink to be used in an ink jet recording system, must have a lower density to eliminate a possibility of clogging a nozzle through which the ink is spouted (as illustrated in FIG. 2 showing the relation between the density of an original image and that of a printed image by the combination of color inks). Accordingly, the complete black is not sufficiently reproduced by the complete UCR which uses only the black ink to reproduce the complete black.

SUMMARY OF THE INVENTION

This invention, conceived in the urge to eliminate the unsatisfactory state of the prior art mentioned above, aims to provide a method for the tone reproduction which, in the reproduction of a color image with a color image forming system such as, an ink jet recording system, enables the color image to be reproduced with multiple tones without inducing the misregistration and reducing the density of the complete black.

DETAILED DESCRIPTION OF THE INVENTION

Now, a working example of the method for tone reproduction according to this invention will be described below with reference to the accompanying drawings.

Figure 1A:
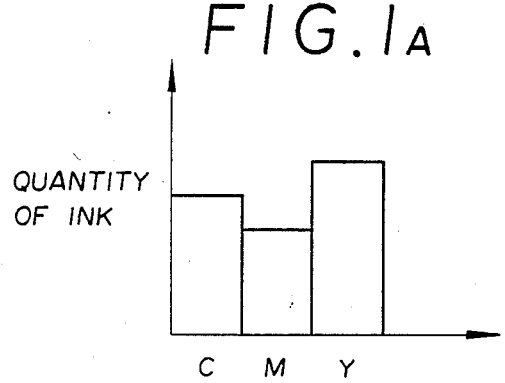
FIG. 1A to FIG. 1D are diagrams meant to aid in the explanation of the conventional method of tone reproduction.
Figure 1B:
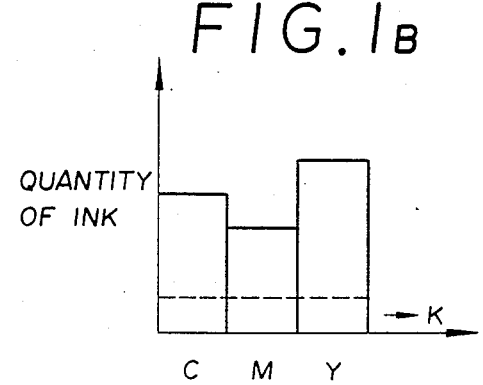
Figure 1C:
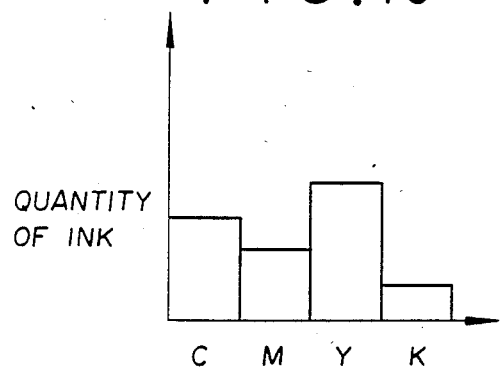
Figure 1D:
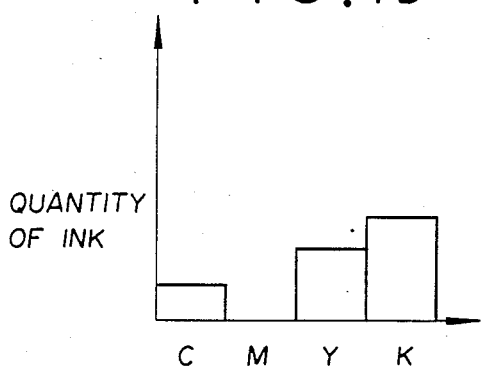
Figure 2:
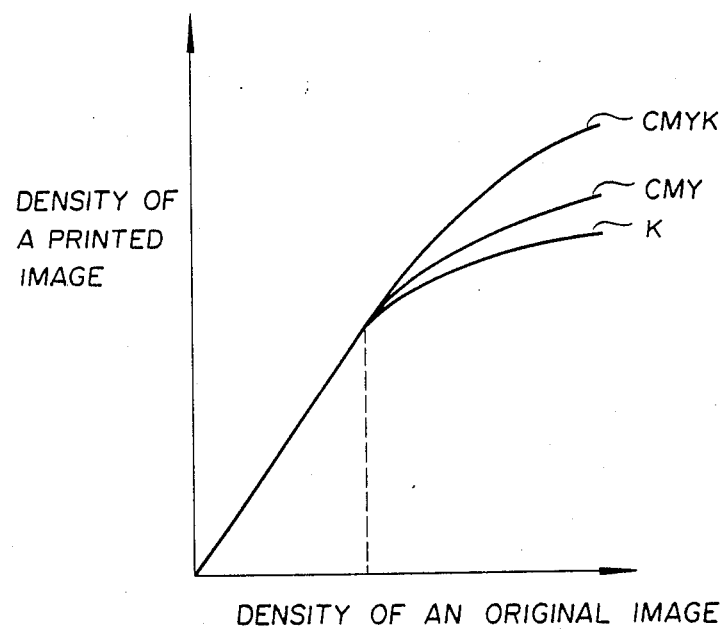
FIG. 2 is a diagram meant to aid in the explanation of a problem involved in the conventional method for tone reproduction.
Figure 3:
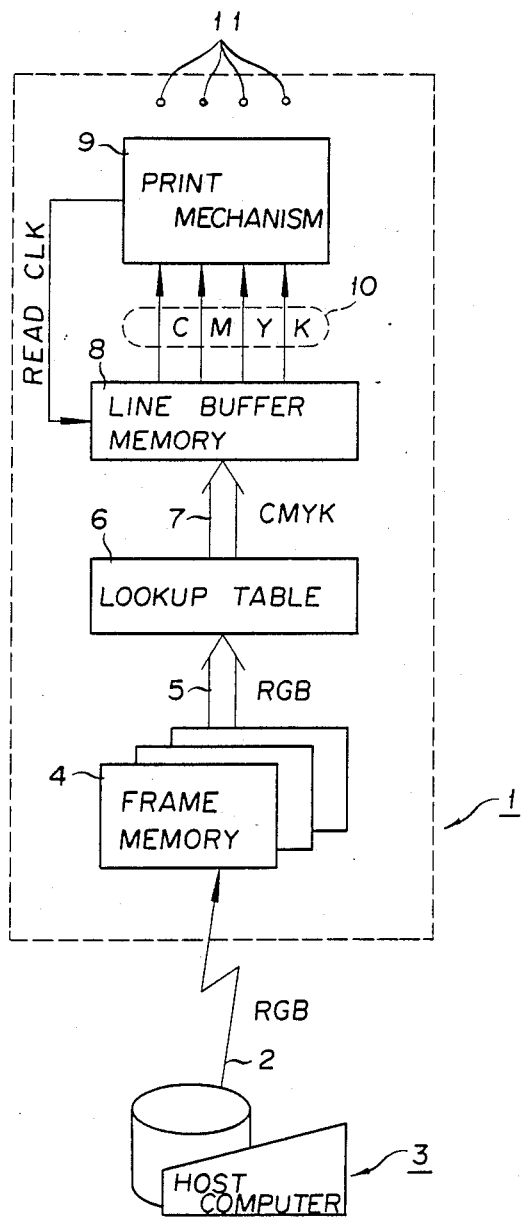
FIg. 3 is a schematic structural diagram of an ink jet recording system in which the method of the present invention for tone production is embodied.

FIG. 3 is a schematic structural diagram illustrating one working example in which the method of this invention for tone reproduction is applied to an ink jet recording system.

As illustrated in this diagram, to an ink jet recording system 1, image data issued in the form of RGB signal from a host computer 3 are injected through a connection cable 2 adapted to transmit the image data and control signals and a suitable interface (not shown). For the purpose of processing the image data, the ink jet recording system 1 is provided therein the following processing circuit.

The image data in the form of RGB signal transmitted from the host computer 3 are fed into a frame memory 4 which is installed inside the ink jet recording system and then stored in a stated address of the memory 4. The term "RGB signal" as used herein refers to the signal to be used for conveying the colors, red (R), green (G), and blue (B), which are three primary colors in the additive mixing. The image data stored in the frame memory 4 are introduced into a lookup table 6 through the medium of an RGB bus 5 adapted to transmit the image data in the form of RGB signal. They are converted, with due information collected from a lookup table prepared in advance, into image data in the form of CMYK signal adapted for the ink jet recording system 1. The term "CMYK signal" as used herein refers to the signal to be used for conveying four colors, namely the three primary colors, yellow (Y), magenta (M), and cyan (C), in the subtractive mixing, plus black (K).

The image data which have resulted from the conversion in the lookup table 6 are forwarded through a CMYK bus 7 adapted for conveyance of dot modulating data in the form of CMYK signal into a line buffer memory 8. The input dot modulating data are divided by color and sequentially stored in line units in pertinent addresses in the line buffer memory 8. The dot modulating data thus stored in the line buffer memory 8 are read out as synchronized with an image read clock READ CLK issued from a print mechanism 9. Then, the dot modulating data read out of the line buffer memory 8 are introduced through a data cable 10 into the print mechanism 9. Print dots 11 are formed on a recording paper as the ink jets are modulated on the basis of the input dot modulating data, with the result that a color image is formed on the recording paper.

Figure 4:
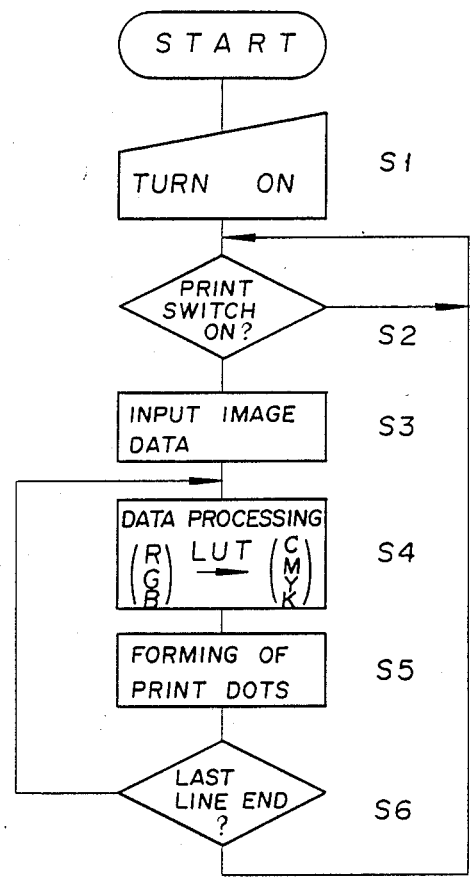
FIG. 4 is a flow chart representing the operation of the ink jet recording system illustrated in FIG. 3.

Now, the operation of the ink jet recording system constructed as indicated above will be described in detail below with reference to the flow chart illustrated in FIG. 4.

First, when the power source switch (not shown) of the ink jet recording system 1 is turned ON (S1) and the control device inside the ink jet recording system 1 is initialized and the system itself is readied for operation, the control device starts a watch to determine whether or not a print switch (not shown) for switch starting the printing operation is turned ON (S2). When the print switch is turned ON, the control device executes a command for introducing image data from the host computer 1 into the frame memory 4 (S3), causing the image data to be sequentially stored in pertinent addresses in the frame memory 4. The image data may be placed in the frame memory 4 before the print switch is turned ON. Then, the control device reads the image data out of the frame memory as contrasted with the positions of recording spots and executes a necessary processing for data conversion in the lookup table 6, in accordance with the addresses of the image data and the due information collected from the lookup table prepared in advance (S4).

Now, the lookup table which is used as the source of information during the processing for conversion in the step S4 will be explained in detail below.

The lookup table is intended to permit the conversion of the image data in the form of RGB signal, as described above, into the dot modulating data in the form of CMYK signal adapted for the ink jet recording system 1, namely the dot modulating data which are capable of forming a color image reproduced in multiple tones with the possible color deviation curbed.

First, the method for tone reproduction contemplated by the present invention will be described in detail below.

Figure 5A:
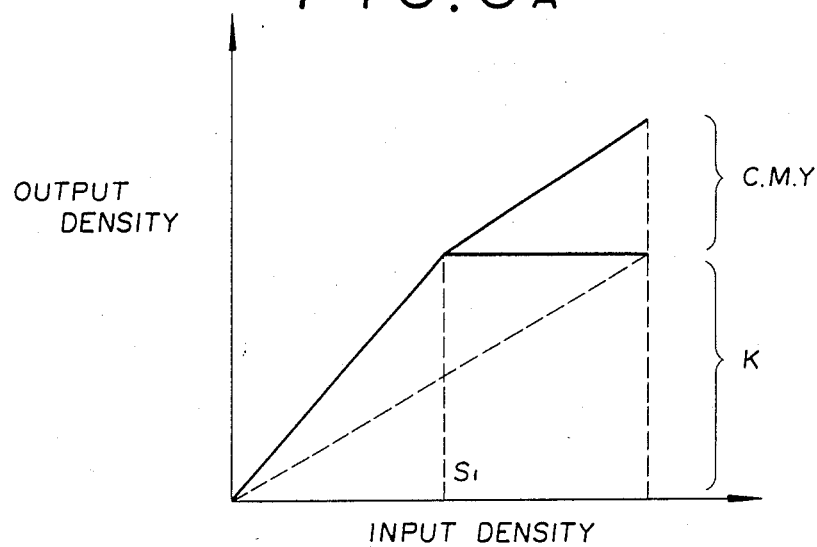
FIG. 5A and FIG. 5B are diagrams meant to aid in the explanation of the method of this invention for tone reproduction.
Figure 5B:
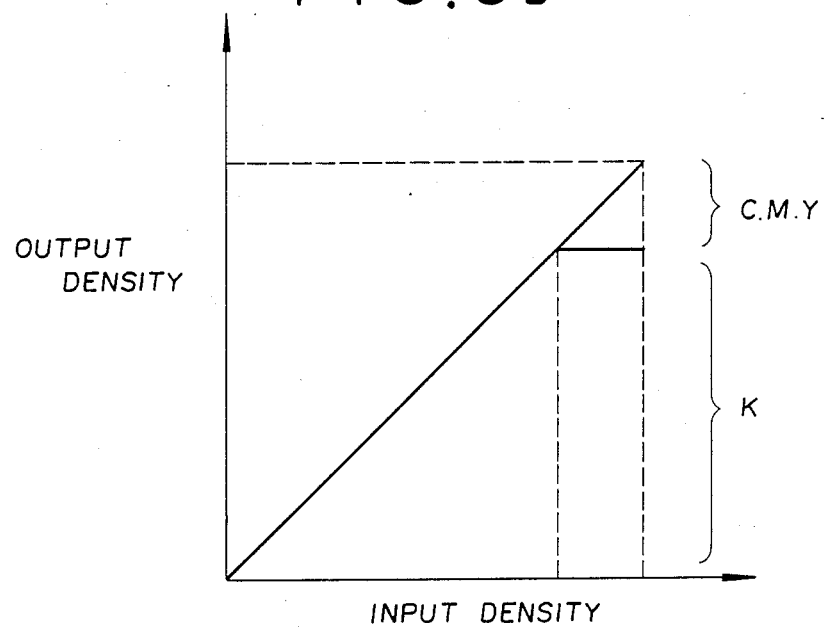

First, the magnitude of a proper intermediate density in the input density of the image data is set as a threshold value, S1 (refer to FIG. 5A which illustrates the method of this invention for tone reproduction in terms of the relation between the input density and the output density). Then, with the threshold value, S1, as a border line, the tone in the region of density lower than the threshold value, S1, is represented by carrying out the complete UCR processing and the tone in the region of density higher than the threshold value, S1, is represented by fixing the amount of black ink and performing the partial UCR treatment in such a manner that the UCR ratio in the part of the highest density is brought to the minimum level including 0% relative to the increase in the input density. FIG. 5b illustrates an example of the linear density characteristic. Here, the threshold value, S1, and the UCR ratio in the part of the highest density may be suitably decided in accordance with the density curve to be required. A concrete means for working the method of tone reproduction described above will be explained in detail below with reference to the drawings.

Figure 6A:
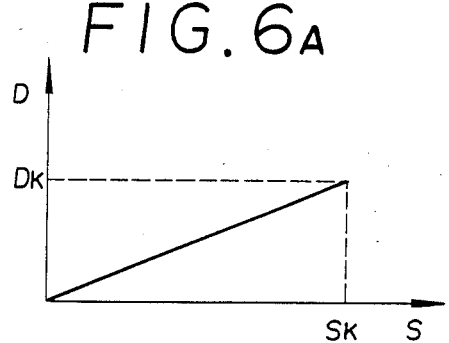
FIG. 6A to FIG. 6E are diagrams meant to aid in the explanation of the embodiment of the method of this invention for tone reproduction in the ink jet recording system.
Figure 6B:
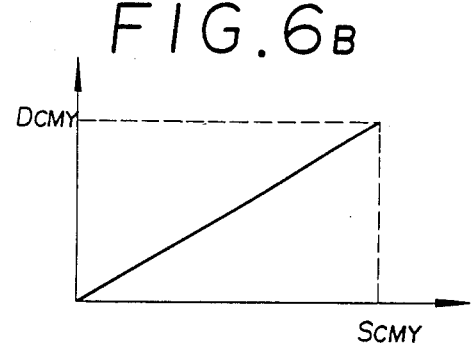

FIG. 6A is a diagram illustrating a density characteristic corresponding to the change in the tone to be represented solely with a black ink and FIG. 6B is a diagram illustrating the density characteristic corresponding to the change in the tone to be represented with the three color, CMY, inks. In the diagrams, the horizontal axis S is the scale of tone level and the vertical axis D the scale of output density.

Figure 6C:
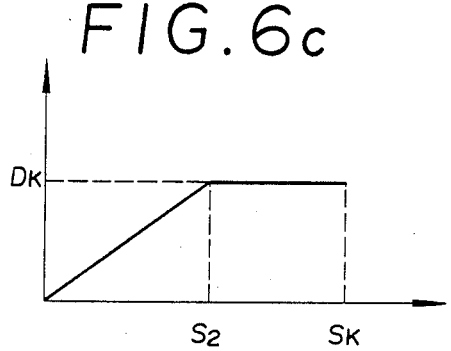

A suitable threshold tone level, S2, is selected from among a plurality of tone levels and a leading edge characteristic of density is fixed so that the highest density, DK, represented solely with a black ink 1 is reached at the threshold tone level S2 as illustrated in FIG. 6C. This threshold tone level, S2, corresponds to the threshold value, S1, mentioned above. The density characteristic is such that the density rises from 0 to the highest degree, DK, in the tone level preceding the threshold level, S2, whereas the density remains at the highest degree, Dk, throughout the entire tone level following the threshold tone level, S2. In this case, the complete UCR processing is executed so that the highest density, Dk, is attained at the threshold tone level, S2.

Figure 6D:
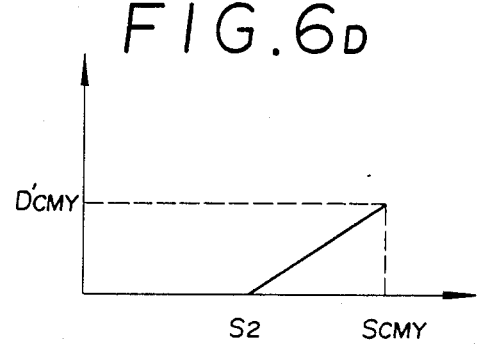

Separately, with respect to the three color, CMY, inks, a leading edge characteristic of density having substantially the same slope as the aforementioned leading edge characteristic is set, with the aforementioned threshold tone level S2 as the initial point, as illustrated in FIG. 6D.

Figure 6E:
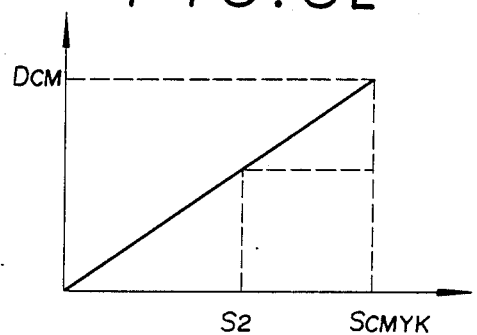

Incidentally, the highest density D'CMY, in this case is displaced in proportion to the slope of the leading edge characteristic mentioned above. In short, the density ,characteristic assumes a leading edge characteristic such that the density in each tone level preceding the threshold tone level, S2, remains at 0, whereas the density in each tone level following the threshold tone level, S2, rises from the threshold tone level, S2, and reaches the aforementioned degree, D'CMY, at the highest tone level. In this case, the UCR processing is not executed and the density in each tone level except for the tone preceding the threshold tone level, S2 is represented with the three color, CMY, inks. A density characteristic illustrated in FIG. 6E is obtained by overlapping the density characteristics illustrated in FIG. 6C and FIG. 6D. What is aimed at by the present invention is attained by forming a lookup table in consideration of this density characteristics, converting image data into dot modulating data with reference to this lookup table, and then forming a color image on the basis of the dot modulating data.

To be specific, the control device, with necessary information collected from the lookup table formed in due consideration of the density characteristic mentioned above and the addresses of the image data, executes the processing for converting the image data sequentially read out of the frame memory 4 in the form of RGB signal into dot modulating data in the form of CMYK signal (S4). Then, the control device causes the dot modulating data resulting from the conversion at the step S4 to be sequentially stored in line units sorted by color in the relevant addresses in the line buffer memory 8. Subsequently, it executes a command to read these dot modulating data from the line buffer memory 8 sequentially as synchronized with the read clock READ CLK from the print mechanism 9 and transfer them to the print mechanism 9. Then, based on the dot modulating data, the print mechanism 9 imparts modulation to the ink dots and causes corresponding print dots to be formed on the recording paper (S5). When the step of S5 is completed, the control device executes a judgment as to whether or not the last line of the image data has been printed out (S6). When the last line has been printed out, the control device is returned to the step S2 and kept waiting until the print switch is turned ON again. When the last line has not been printed out, the control device is returned to the step S5 and repeat the subsequent steps.

In the color image thus obtained, otherwise possible color deviation is rendered inconspicuous because the complete UCR processing is executed to effect the reproduction of tone either solely with a black ink or with a small number of inks consisting of a black ink and two or the three color, CMY, inks in the region in which the color deviation stands out from the viewpoint of vidual sense, namely the region of lower tone than the threshold tone level, S2. Where an achromatic tone, is reproduced in the low tone region, the color deviation is particularly conspicuous. In this case, however, since the tone reproduction can be obtained by solely using the black ink, the color image to be formed is perfectly free from color deviation. In contrast, in the region of higher tone than the threshold tone level, S2, the tone is reproduced with the final density obtained by allowing the density represented by gradually increasing the amounts of the three color, CMY, inks to overlap the highest degree, Dk, of the density represented solely with the black ink. In this case, therefore, the color image to be formed is in a tone of smooth natural graduation. This color image is formed in a larger number of tone than that which is formed in the highest degree, Dk, of the density represented solely with the black ink.

By way of example, the black ink data KO obtained by direct conversion from the RGB data corresponding to image data RGB represented in 16 tones in the form of RGB signal, the black ink data K obtained in the present working example, and the YMC collection data are shown in the following table. The density f the black ink employed in the present working example corresponds to the level "4" in the RGB data.

TABLE

| RGB | KO | K | δ |
|---|---|---|---|
| 15 | 0 | 0 | 0 |
| 14 | 1 | 1 | 0 |
| 13 | 2 | 3 | 0 |
| 12 | 3 | 5 | 0 |
| 11 | 4 | 7 | 0 |
| 10 | 5 | 9 | 0 |
| 9 | 6 | 10 | 0 |
| 8 | 7 | 11 | 0 |
| 7 | 8 | 12 | 0 |
| 6 | 9 | 13 | 0 |
| 5 | 10 | 14 | 0 |
| 4 | 11 | 15 | 0 |
| 3 | 12 | 15 | 2 |
| 2 | 13 | 15 | 8 |
| 1 | 14 | 15 | 11 |
| 0 | 15 | 15 | 15 |

The following expressions hold between the form of RGB signal and the form of CMY.

$$K = T\,(KO)$$

$$\begin{vmatrix} C \\ M \\ Y \end{vmatrix} = \begin{vmatrix} R\,MAX - R \\ G\,MAX - G \\ B\,MAX - B \end{vmatrix} - K' \begin{vmatrix} 1 \\ 1 \\ 1 \end{vmatrix}$$

wherein
$KO = [(RMAX-R), (GMAX-G), (BMAX-B)]MIN$
$K' = KO - \delta$
and T' stands for a table which is set for the conversion of signals as shown in the foregoing table.

In the table described above, the level "4" of the RGB data corresponds to the threshold tone level, S2. In this case, the black ink data K assumes the highest tone level "15." When the level of the RGB data is "4" or below, the black ink data K are maintained on the highest tone level "15" and are allowed to feed out the YMC correction data δ. Owing to the production of the correction data δ, the YMC inks are caused to overlap the black ink and ensure reproduction of black in ample density in the region of high tone.

In the present working example, the method for tone reproduction contemplated by the present invention has been described as applied to an ink jet recording system. This invention is never limited to this example. It produces virtually the same effect when it is applied to such a non-impact type recording system such as, for example, a thermographic recording system.

What is claimed is:

1. A method for forming a multi-tone color image using the inks of the four colors, cyan, magenta, yellow, and black, which method comprises effecting reproduction of an achromatic color component of a recording spot by solely using said black ink where the tone level of the achromatic color component is lower than a prescribed value and by using the inks of the three colors of cyan, magenta, and yellow together with the black ink where said tone level is higher than said prescribed value.

2. A method for reproduction of a multi-tone color image by combination of chromatic inks of cyan, magenta and yellow, together with an achromatic ink of black, which method comprises effecting said reproduction of said multi-tone color image by performing a complete under color removal in the region of the tone levels of the image lower than a prescribed value and effecting said reproduction of said tone by performing an under color removal at a removal ratio of decrease proportionate to the increase of the tone levels in the region of the tone levels higher than said prescribed value.

3. A method according to claim 1, wherein said prescribed value is set near the border line at which the color deviation begins to gain in conspicuity from the viewpoint of visual sense.

4. A method according to claim 1, wherein the removal ratio of decrease of the under color removal in the region of higher tone levels than said prescribed value is linear relative to the rise of tone levels.

5. A method according to claim 1, wherein the ratio of change of density relative to the change of tone in the region of lower tone than said prescribed tone level is identical with the ratio of change of the density relative to the change of tone in the region of higher tone than said prescribed tone level.

6. A method according to claim 2, wherein said prescribed value is set near the border line at which the color deviation begins to gain in conspicuity from the viewpoint of visual sense.

7. A method according to claim 2, wherein the removal ratio of decrease of the under color removal in the region of higher tone levels than said prescribed value is linear relative to the rise of tone levels.

8. A method according to claim 2, wherein the ratio of change of density relative to the change of tone in the region of lower tone than said prescribed tone level is identical with the ratio of change of the density relative to the change of tone in the region of higher tone than said prescribed tone level.

* * * * *